INVENTOR:
THOMAS T. TRUE,

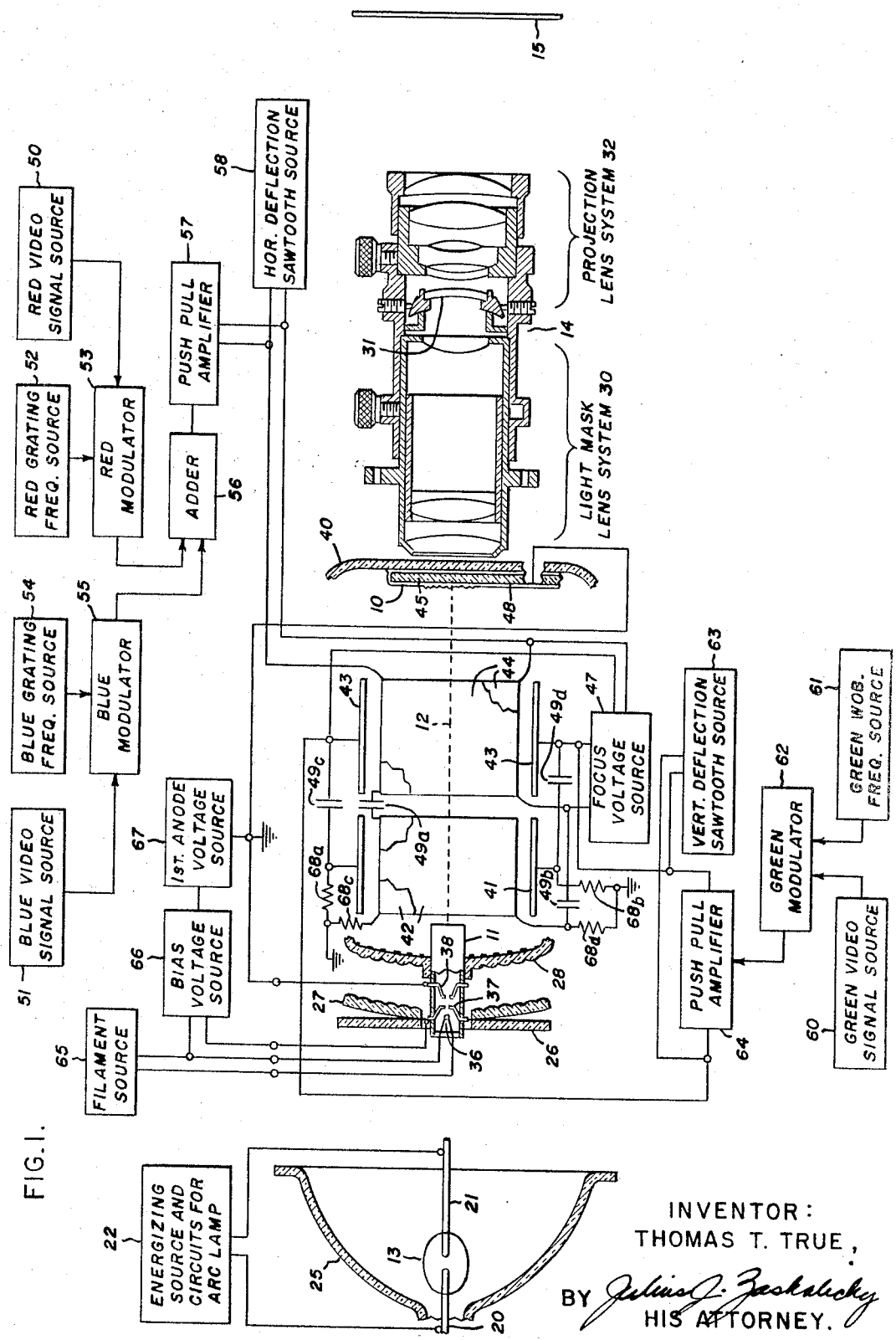

INVENTOR:
THOMAS T. TRUE,

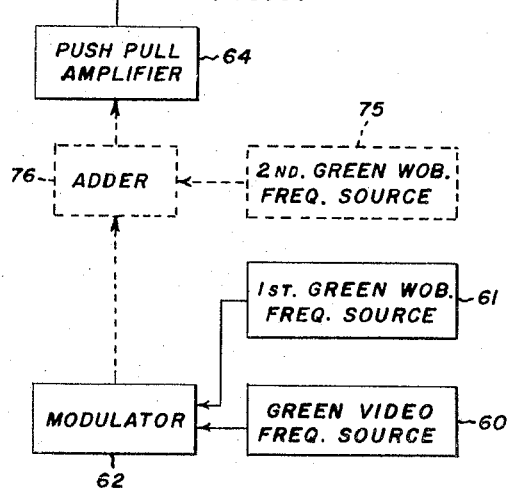
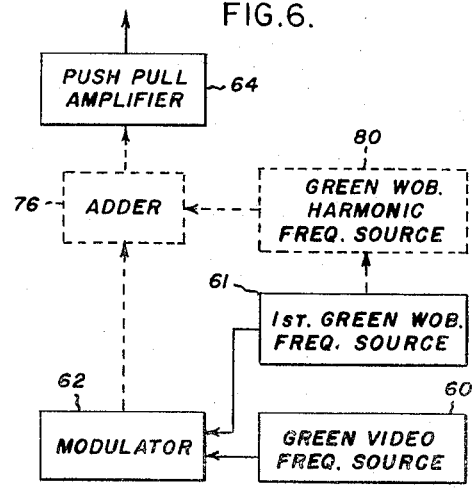
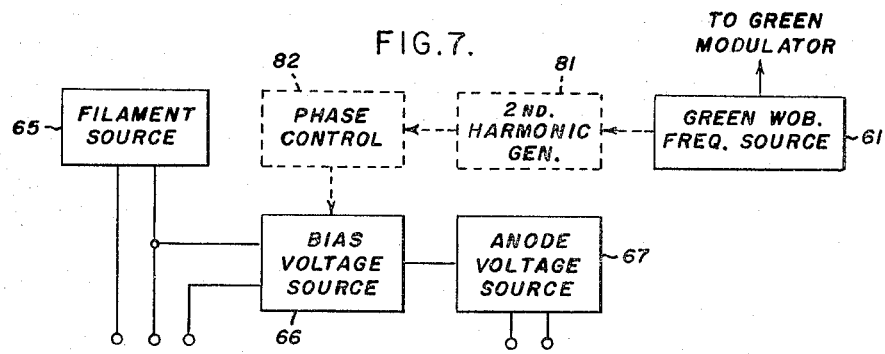
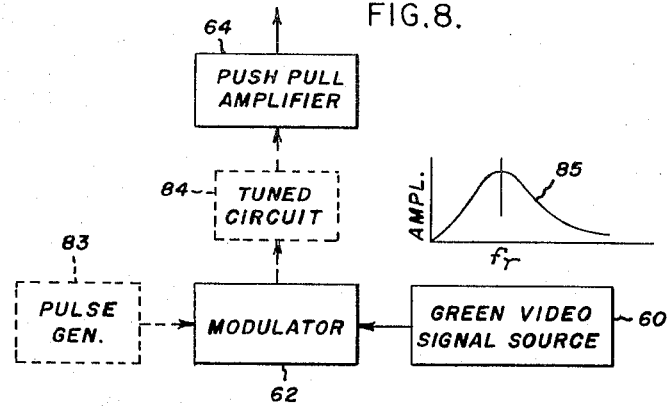
INVENTOR:
THOMAS T. TRUE,
BY
HIS ATTORNEY.

United States Patent Office 3,305,629
Patented Feb. 21, 1967

3,305,629
DEFRACTING MEDIUM PROJECTION SYSTEM INCLUDING MEANS TO EFFECT A UNIFORM CHARGE OVER SAID MEDIUM
Thomas T. True, Camillus, N.Y., assignor to General Electric Company, a corporation of New York
Filed May 7, 1964, Ser. No. 365,631
9 Claims. (Cl. 178—5.4)

The present invention relates to improvements in systems for the projection of images of the kind including a light modulating medium formable into diffraction gratings by electron charge deposited thereon in accordance with electrical signals corresponding to the images.

More particularly, the invention relates to the projection of color images using a common area of the viscous light modulating medium and a common electron beam to produce deformations in the medium for simultaneously controlling therein point by point the primary color components in kind and intensity in a beam of light in response to a plurality of simultaneous electrical signals, each deformation corresponding point by point to the intensity of a respective primary color component of an image to be projected by such beam of light.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of oil in which the electron beam forms phase diffraction gratings having adjacent valleys spaced apart by a predetermined distance. Each portion of light incident on a respective small area or point of the medium is deviated in a direction orthogonal to the direction of the valleys. The intensity of the deviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations the period of scan are changed in amplitude the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which constituted of primary color components of light, is directed on a diffraction grating, light impinging therefrom is dispersed into a series of spectra on each side of a line representing the direction of path of the undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on. If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light passed by the color pencil. The apertures in a light output mask are of predetermined extent and at locations in order to selectively pass the primary color components of the diffraction spectrum. The line to line spacing of each of the three primary diffraction gratings determines the width and location of the cooperating slot to pass the respective primary color component when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color components. Projection of such a beam reconstitutes in color the image corresponding to the electrical signals.

When three diffraction gratings are formed simultaneously on a common area of the light modulating medium each having lines extending in the same direction, beat gratings are produced which have an adverse effect on the efficiencies of color channels of the system and also upon the purity of primary color light passed by each of the channels whereby the reproduction of the color image is deleteriously affected. Such problems are partly resolved in a system in which one of the diffraction gratings has lines orthogonal to the direction of the lines of the other two diffraction gratings. Such a system is described and claimed in U.S. Patent 3,078,338, W. E. Glenn, Jr., assigned to the assignee of the present invention. The problem of the adverse effects of beats is now simplified in that only two primary gratings have lines extending in the same direction. Such problem is resolved by appropriate arrangement of the elements of the system and their mode of operation as more fully described and claimed in a copending application Serial No. 343,990, filed February 11, 1964, and assigned to the assignee of the present invention.

Preferably, in the latter described system the one grating lines correspond in direction to the direction of horizontal scan, and the line to line spacing correspond to the line to line spacing in a field of scan. Of course, the lines of the other diffraction grating would be perpendicular or orthogonal to the lines of the one grating. In such a system it has been found advantageous to form the gratings corresponding to the red and blue primary color components with lines orthogonal to the direction of horizontal scan, and to utilize the grating formed by the lines of horizontal scan for control of the green color components in the image.

To obtain good image rendition it is essential that in each of the primary color channels in the absence of corresponding video modulating signals that light passing through the respective channel be completely blocked, i.e., produce on the screen a dark field with respect to that color. It is also essential that as the amplitude of video modulating signal for each of the channels is increased that the light projected in each of the channels correspondingly increase. It is further essential that the gradations of amplitude from minimum to maximum in each of the video signals applied to respective channels produce corresponding gradations in intensity.

The maximum intensity producible in each of the channels should be sufficiently great so as to enable proper and faithful reproductions in the contrast of the image to be projected. In the case of the red and blue channels the dark field is achieved by the absence of modulation, and the light field is achieved by appropriate modulation of the light modulating medium in accordance with the red and blue signals. While the production of a red and blue dark field is achieved by zero carrier modulation of the beam scan, green dark field is produced by maximum carrier modulation of beam scan, and the maximum light field is produced by zero carrier modulation of beam scan. To obtain good dark field in the green channel for a projected image it is necessary to provide highly uniform depoition of charge over the light modulating medium.

When sinusoidal waveforms of such high frequency are used to modulate the position of the electron beam to form the green diffraction grating, certain problems are presented with regard to the formation of an adequate dark field. As the peak of the sinusoidal wave of the electron beam is moving slowly over the raster in the vertical direction it dwells in that corresponding location for a larger period of time than in the other vertical locations about the horizontal scan line as an axis. Accordingly a bunching of charge is produced which produces deformations. Such a bunching of charge make it difficult to achieve a uniform deposition or blanketing of charge over the raster.

In the formation of the diffraction gratings for the red and blue primary color channels high frequency waves of sinusoidal form in the many megacycle range are utilized. One of the possible ways to achieve good dark green field is to alter the cross-sectional or spot size of the electron beam impinging on the light modulating medium to produce a uniform blanket of charge thereon. Such an arrangement presents several problems. One problem is that the spot size would vary in different portions of the raster as the electron beam impinges on the raster at different angles, and another problem is that spot size alterations in the vertical direction, while not in themselves difficult to achieve, rapidly would cause a change in size in the horizontal direction, thereby affecting the gratings formed in the light modulating medium for the red and blue channels. For such reasons as those mentioned above, it has been found desirable to utilize spot size which is relatively uniform and to modulate the position of the spot on which the electron beam impinges about the horizontal axis of scan on the raster by appropriate sinusoidal wave modulation of high frequency. Such modulation of the position of the electron beam is referred to as wobbulation. Such an arrangement has the advantage that the wobbulating carrier and the vertical sweep are applied to the same electrode and any mild nonlinearities in the deflection plate to raster transfer characteristic are compensated because the line to line spacing and wobbulating sensitivity vary together in the same direction.

The blanketing of the light modulating medium with a uniform charge of electrons by sinusoidal modulation is simplified or easier to achieve when the electron beam spot size is increased with respect to the line to line spacing in a field. However, as the electron beam is increased in size it becomes increasingly difficult to produce a sufficient concentration or bunching of charge in response to green video modulating signal to produce sufficient deformation in the modulating medium to permit a corresponding amount of light to pass through the green channel, i.e., the maximum green light field and gradations in dark to light field are less than desired. For good image rendition it is important to have the contrast between maximum to minimum illumination greater than a certain minimal ratio in the neighborhood of about 100 to 1. Accordingly, while it is desirable on the one hand for good dark field to have a large ratio of electron beam spot size to raster line spacing, on the other hand for good light field and contrast ratios it is important to have smaller ratios of electron beam spot size to raster line spacing. For some modulating media a suitable ratio of beam spot size to raster line spacing for a contrast ratio of 100 to 1 between the light and the dark field is hard to achieve. For other media such ratio of beam spot size to raster line spacing exists within a small range. For most viscous modulating media the choice of beam spot size is limited to a very small range of sizes for a given line to line spacing. If a system is designed around such a small range, the size of beam must be closely controlled otherwise the system is subject to extraneous influences which destroy the quality of the projected image.

The present invention is directed to the provision of means in a system such as that described above which enables beams of smaller cross sectional dimensions to be utilized with consequent improved capability with respect to obtaining good contrast ratios and at the same time enabling good dark fields to be obtained. With such an arrangement greater regulation is allowable in electron beam spot size, thus rendering the system less sensitive to extraneous influences which would affect the picture quality.

The novel features believed characteristic of the present invention are set forth in the appended claims. The invention itself, together with further objects and advantages thereof, may best be understood by reference to the following description taken in connection with the accompanying drawings in which:

FIGURE 1 is a schematic diagram of the optical and electrical elements of a color television projection system useful in explaining the present invention.

FIGURE 5 is a block diagram of a modification of the electrical portions of the system of FIGURE 1 in accordance with one aspect of the present invention.

FIGURE 6 is a block diagram of another modification in the electrical portion of the system of FIGURE 1 in accordance with another aspect of the present invention.

FIGURE 7 is a block diagram of a further modification in the electrical portion of the system of FIGURE 1 in accordance with a further aspect of the present invention.

Figure 2A:
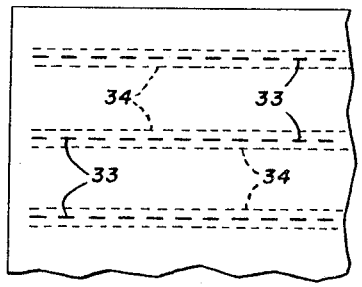
FIGURE 2A is a diagrammatic representation of the active area of the light modulating medium of the system of FIGURE 1 showing horizontal scan lines and the location of charge with respect thereto for the green color channel for light field conditions.

Referring now to FIGURE 1 there is shown a simultaneous color projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of a voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in the horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally orinented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on separate elements of the transparent slots in the input mask portion of member 28. Each of the lenticules on the lens plate portion of member 28 images a corresponding lenticule of the first plate member onto the active area of the light modulating medium 10. With the arrangement described efficient utiliaztion is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 14, and is projected by the projection lens system 32 onto the screen 15. The details of the light input optics of the light valve projection system shown in FIGURE 1 are described in a copending patent application Serial No. 316,606, filed October 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system comprises five elements. The plurality of lenses are provided in the light mask and projection lens system to correct for the various aberrations in a single lens system. The projection lens system 32 in combination with the light mask lens system 31 comprises a composite lens system for imaging the light modulating medium on a distant screen on which the image is to be projected. The details of the light mask and projection lens system are described in patent application Serial No. 336,505, filed January 8, 1964, and assigned to the assignee of the present invention.

According to present day monochrome and color television standards in force in the United States an image to be projected by a television system is scanned by a light-to-electrical signal converter horizontally once every $\frac{1}{15750}$ of a second, and vertically at a rate of one field of alternate lines every $\frac{1}{60}$ of a second. Correspondingly, an electron beam of a light producing or controlling device is caused to move at a horizontal scan frequency of 15,750 cycles per second in synchronism with the scanning of the light converter, and to form thereby images of light varying in intensity in accordance with the brightness of the image to be projected. The pattern of scanning lines, as well as the area of scan, is commonly referred to as the raster.

In FIGURE 2A is shown a section of the raster of the light modulating medium on which the green diffraction grating has been formed. In this figure are shown the alternate scanning lines 33 of a frame or adjacent lines of a field. On each side of the scanning lines are shown dotted lines 34 schematically representing concentrations of charge extending in the direction of the scanning lines to form a diffraction grating having lines or valleys extending in the horizontal direction. The green diffraction grating is controlled by modulating the electron scanning beam at a high frequency rate, nominally about 54 megacycles, in the vertical direction, i.e., perpendicular to the direction of the lines to produce a uniform spreading out or smearing of the charge transverse to the scanning direction of the beam. The amplitude of the resultant deformation of such spreading out of charge varies proportionally with the amplitude of the high frequency carrier signal, the amplitude of which in turn varies inversely with the amplitude of the green video signal. With low modulation of the carrier wave more charge is concentrated in a line along the center of the scanning direction than with high modulatioin thereby producing a greater deformation in the light modulation at that part of the line. In short, the natural grating formed by the focused beam represents maximum green modulation or light field, and the defocussing by the high frequency modulation spreads or smears such grating in accordance with the amplitude of such modulation. For good dark field the grating should be virtually wiped out.

Figure 2B:
FIGURE 2B is a side view of the light modulating medium of FIGURE 2A showing the deformation which the deposited charge produces therein.

FIGURE 2B shows a sectional view of the light modulating medium of FIGURE 2A showing the manner in which the concentrations of charge along the adjacent lines of a field function to deform the light modulating medium into a series of valleys and peaks representing a phase diffraction grating.

Figure 2C:
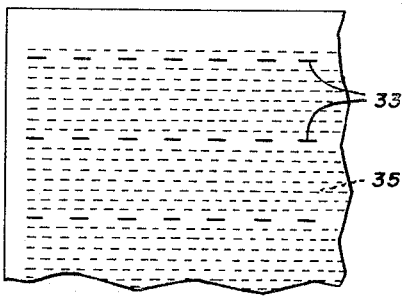
FIGURE 2C is a diagrammatic representation of the active area of the light modulating medium of the system of FIGURE 1 showing horizontal scan lines and the location of electron charge over the entire medium for dark field conditions.

FIGURE 2C shows the distribution of electron charge 35 over the surface of the light modulating medium under conditions such as are desired for producing minimal differential charge thereon, and hence good dark field conditions.

Figure 2D:
FIGURE 2D is a side view of the light modulating medium of FIGURE 2C showing the effect of a uniform blanket of charge thereon.

FIGURE 2D is a side view of the light modulating medium of FIGURE 2C showing that with uniform charge distribution virtually no differential deformation appears on the surface of the light modulating medium.

As used in this specification with reference to the specific raster area of the light modulating medium, a point represents an area of the order of several square mils (a mil is one-thousandth of an inch) and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in a system such as the kind under consideration herein one grating line is adequate to function for proper control of the luminance characteristic of a picture element in the projected image and that about three to four lines are a minimum for the proper control of the hue and the saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in repsonse to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr., assigned to the same assignee as the present invention.

When a pair of phase diffraction gratings such as those described are simultaneously formed and superimposed in a light modulating medium, inherently another diffraction grating, referred to as the beat frequency grating is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phrase gratings must be formed in a manner to have lines or valleys, or components thereof, extending in the same direction. The manner in which such effects can be avoided are described and claimed in a copending patent application, Serial No. 343,990, filed February 11, 1964, and assigned to the assignee of the present invention.

Referring again to FIGURE 1, an electron writing system is provided for producing the phase diffraction gratings in the light modulating medium, and comprises an evacuated enclosure 40 in which are included an electron beam device 11 having a cathode 36, a control electrode 37, and a first anode 38, a pair of vertical deflection plates 41, a pair of horizontal deflection plates 42, a set of vertical focus and deflection electrodes 43, a set of horizontal focus and deflection electrodes 44, and the light modulating medium 10. The filament source 65 provides energization for the cathode 36 of the device 11. The bias source 66 connected between the cathode 36 and the control electrode 37 provides a means for control of the current in the electron beam device 11. The first anode voltage source 76 essentially connected between the cathode 36 and the first anode 38 provides the desired acceleration to the electron of electron beam 12. The target electrode or second anode 48 and the first anode 38 are maintained at ground potential, and the cathode and control electrode are at very large negative potentials of the order of several thousand volts with respect to ground. The electrodes 43 and 44 are biased in potential to values highly negative with respect to ground by focus voltage source 47 and control the focus of the electron beam 12 on the light modulating medium. As the plates 43 and 44 are at a high negative potential and are situated between electrodes 41, 42 and electrode 48 which are at ground potential, the electron beam is quite sensitive to focus and deflection potentials applied to these plates. Plates 41 and 42 also provide a deflection and focus function, but are less sensitive to applied deflection voltages than plates 43 and 44. Suitable high impedance resistors 68a, 68b, 68c, and 68d connected between respective ones of electrodes 41 and 42 provided D.C. ground for the electrodes.

A pair of carrier waves which produce the red and blue gratings, in addition to the horizontal deflection voltage are applied to the horizontal plates 42 and 44. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 and 43 to spread the beam out in accordance with the amplitude of the green video signal as explained above. The light modulating medium 10 is a fluid of appropriate viscosity and of charge decay characteristics disposed on a transparent support member 45 coated with a transparent conductive layer, for example, indium oxide adjacent the fluid to form the second anode or target electrode 48. The electrical conductivity of the light modulating medium is so constituted that the amplitude of the diffraction gratings decay to a small value after each field of scan thereby permitting variations in amplitude of the diffraction grating at the sixty cycle per second field scanning rate. The viscosity and other properties of the light modulating medium are selected such that the deposited charges produce the desired deformations in the surface. Of course, in accordance with television practice the control electrode 37 is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from source 50 and carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal deflection plates 44. The output of horizontal deflection sawtooth source 58 is also applied to plates 44 and to plates 42 through capacitors 49a and 49b.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of vertical deflection sawtooth source 63 is also applied to plates 43 and to plates 41 through capacitors 49c and 49d.

A circuit for accomplishing the deflection and focusing functions described above in conjunction with deflection and focusing electrode system comprising two sets of four electrodes such as shown in FIGURE 1 is shown and described in a copending patent application Serial No. 335,117, filed January 2, 1964, and assigned to the assignee of the present invention. An alternative electrode system and associated circuit for accomplishing the deflection and focussing function is described in the aforementioned copending patent application, Serial No. 343,990.

Figure 3:
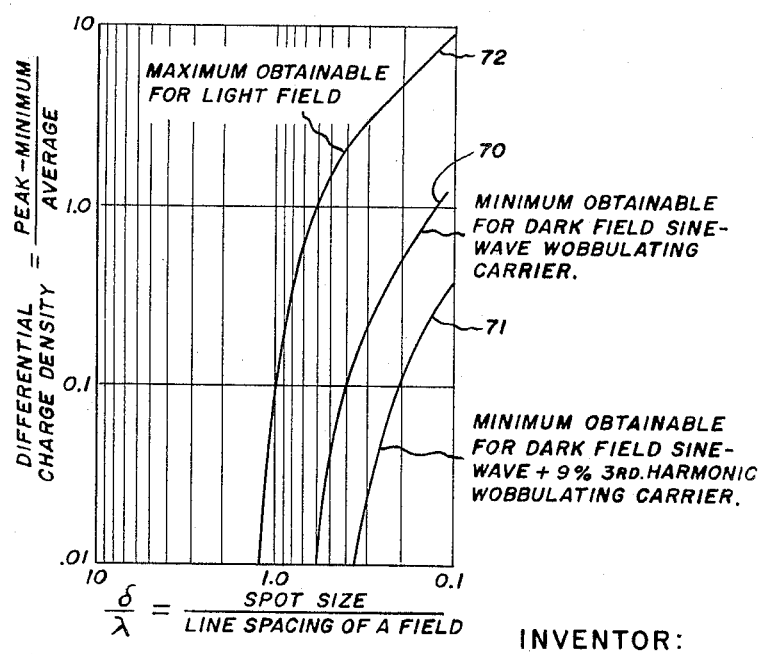
FIGURE 3 shows graphs in logarithmic coordinates of differential charge density as a function of the ratio of spot size to raster line spacing for light and dark field conditions and various modulation waves.

Referring now to FIGURE 3 there are shown graphs of the manner in which the differential charge density on the light modulating medium, which is defined as peak charge density minus minimum charge density divided by average charge density, varies with the ratio of spot size in the vertical direction to raster line spacing for various conditions of modulation. Graph 70 represents minimum differential charge density as a function of relative spot size, which is defined as vertical spot size divided by line spacing of a field, obtainable for dark field under sine wave high frequency modulation of wobbulation. Graph 71 shows such relationship of minimum differential charge density as a function of vertical spot size obtainable for dark field in accordance with one aspect of the present invention, specifically the utilization of a high frequency wobbulating wave, with the addition of appropriate, approximately 10%, third harmonic in the manner to be described below. Graph 72 represents maximum differential charge density as a function of relative vertical spot size obtainable for light field with absence of sine wave high frequency modulation.

It is desirable to utilize sine wave high frequency wobbulation of the electron beam for the reason indicated above among which are that such waves are easily generated and applied to the various electrodes of the electron beam device. However, in connection with such wobbulation, when the high frequency wave is close to zero amplitude, the electron beam is moving the fastest in the vertical direction, and when the high frequency wobbulating wave is a either peak, it is moving the slowest. Thus, larger concentrations of charge are deposited adjacent the axis of the line of scan than more remote therefrom corresponding to the peaks of the modulating carrier wave.

Referring now to FIGURES 4A through 4J there are shown diagrams of voltage versus time of the various waves appearing at various points of the apparatus of FIGURE 1 which will be useful in connection with FIGURES 5 through 8 to explain the operation thereof in accordance with the present invention.

Figure 4A:
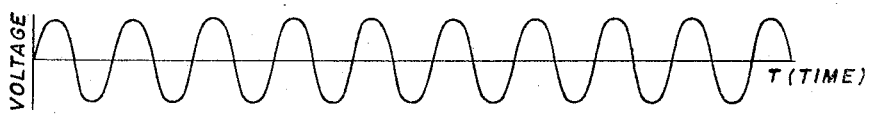
FIGURES 4A through 4J are graphical representations of voltage as a function of time occurring at various points in the system of FIGURES 1, and 5 through 8 useful in explaining the operation of the present invention.
Figure 4B:
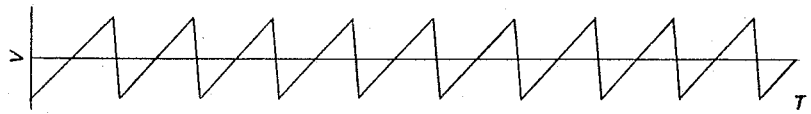
Figure 4C:
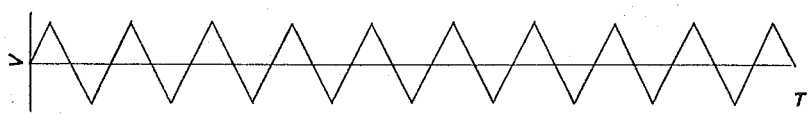
Figure 4D:
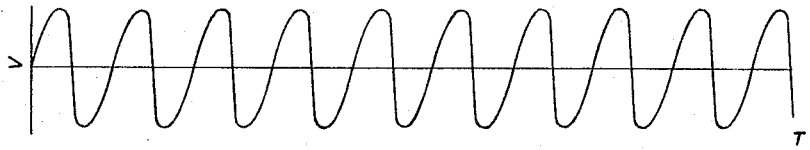
Figure 4E:
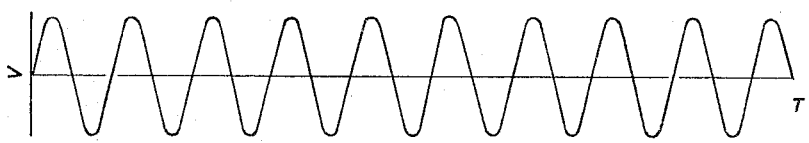
Figure 4F:
Figure 4G:
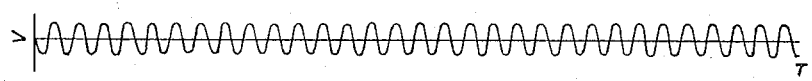

FIGURE 4A shows a high frequency sine wave which is applied to the vertical deflection plates of the electron beam device of FIGURE 1 to produce modulation or wobbulation of the beam thereof which is of constant current and relatively constant size to produce the spreading out of electron charge thereon inversely in accordance with the magnitude of the electrical signal representing the green color component of the image to be projected. In accordance with the present invention waves of more uniform rates of travel in the vertical direction are utilized to avoid the undesired effects mentioned. Such wave forms are shown in idealized form in FIGURES 4B and 4C. FIGURE 4B shows a sawtoothed wave each cycle of which has a gradually and uniformly rising portion, and an abruptly and uniformly falling portion. FIGURE 4C shows an essentially symmetrical triangular wave, each cycle of which has a linear rising portion and a linear falling portion of substantially the same duration. Wave forms such as either of these wave forms applied to produce vertical deflection of the electron beam produce a much more uniform distribution of electron charge on the medium with the result that excellent dark field condition in the apparatus is obtainable. Waveforms such as shown in FIGURES 4B and 4C are difficult to obtain at high frequencies. FIGURES 4D through 4E show waveforms which approximate the waveforms of FIGURES 4B and 4C, respectively. Waveforms of FIGURES 4D and 4E may be relatively simply obtained and enable results equivalent to the results obtainable by the application of waveforms of FIGURES 4B and 4C to be obtained in the manner to be more fully described below. FIGURE 4F shows a waveform which is the second harmonic of the wave of FIGURE 4A. When such a wave is combined with the wave of FIGURE 4A in appropriate amplitude, for example, one-third the amplitude of waveform of FIGURE 4A and in phase such that at the origin both waves are at zero amplitude but moving in the opposite directions the resultant wave shown in FIGURE 4D is produced which represents a good first approximation to the wave of the outline of FIGURE 4B. Such resultant wave may be modulated with the green video signal source and applied to the push-pull amplifier of the system of FIGURE 1 along with the vertical deflection voltage with very good results with respect to producing a smaller differential charge density under dark field conditions without appreciably affecting the operation of the system under light field conditions. It has also been found that the harmonic wave, appropriate in magnitude and phase, can be added subsequent to the main green wobbulating frequency source modulated by the green video signal with good results. FIGURE 4G shows a wave which is the third harmonic of the main wobbulating frequency wave shown in FIGURE 4A. When such a wave of appropriate amplitude, for example 10% of the amplitude of the wave of FIGURE 4A, and appropriately related in phase such that the positive peak of the third harmonic corresponds to the positive peak of the fundamental wave, a resultant wave such as shown in FIGURE 4E results which represents a good approximation of the essential identical triangular wave of FIGURE 4C. When such a wave appropriately modulated is applied to the push-pull amplifier of the system of FIGURE 1 considerable improvement in differential charge distribution under dark field conditions results while virtually leaving unaffected the operation of the system under light field conditions. As in connection with the second harmonic wave the third harmonic of appropriate magnitude and appropriately related in phase to the main wave may be applied in unmodulated form to the push-pull amplifier in the manner to be described below in connection with FIGURE 6.

Figure 4H:
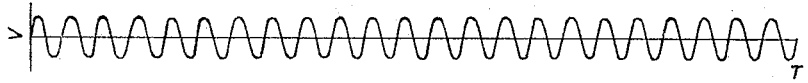

FIGURE 4H shows a wave of substantially higher frequency than the frequency of the wave of FIGURE 4D and at least of the order of twice as great, and smaller in amplitude with respect thereto. It has been found that with such a wave applied simultaneously to the vertical deflection plates desired charge distribution for good dark field can be achieved.

Figure 4I:
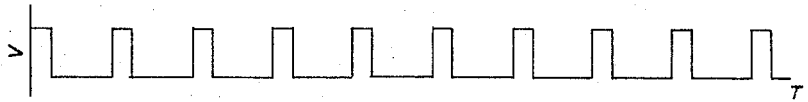
Figure 4J:
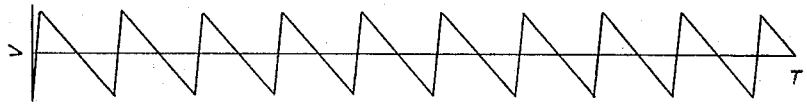

FIGURE 4I shows a waveform consisting of pulses occurring at the same frequency rate as the frequency of the waveform of FIGURE 4A. When such a waveform is applied to a suitable transducer a wave such as shown in FIGURE 4J can be developed. The waveform of FIGURE 4J is essentially of sawtooth outline such as waveform of FIGURE 4B but of reversed polarity or phase and having the same fundamental frequency as the waveform of FIGURE 4A. The manner of application of waveform 4I and the manner of obtaining the wave of FIGURE 4J will be described in greater detail below in connection with FIGURE 8.

FIGURE 5 is a block diagram of a portion of the electrical part of the system of FIGURE 1 showing an improvement therein in accordance with one form of the present invention. In FIGURE 5 the same reference numerals are used to indicate identical elements of FIGURE 1 and the essential additions to FIGURE 1 are indicated in FIGURE 5 in dotted blocks and dotted interconnections. This figure includes the addition of a second green wobbulating frequency source 75 of substantially higher frequency, at least of the order of twice as great as the frequency of the fundamental green wobbulating source and smaller in amplitude thereto. The output of the source 75 is applied to an adder 76 which adds the output of the modulated first green wobbulating frequency source with the output of the second green wobbulating source. The output of the adder 76 is applied to the push-pull amplifier 64 to produce the desired results. It has been found that the addition of another high frequency wave of the character indicated to produce wobbulation in the beam in the vertical direction has the effect of producing much more uniform distribution of charge on the light modulating medium with resultant considerably improved dark field conditions without appreciably affecting the performance of the system under light field conditions.

FIGURE 6 shows another circuit modification of the electrical part of the system of FIGURE 1 for providing minimal differential charge distribution under dark field conditions. In FIGURE 6 the same reference numerals are used to indicate identical elements of FIGURE 1 and the essential additions to FIGURE 1 are indicated in dotted blocks and dotted interconnections in FIGURE 6. More specifically, the addition in FIGURE 6 consists of the provision of another green wobbulating harmonic frequency source 80 which is harmonically related in frequency to the fundamental green frequency wobbulating source 61. The harmonic frequency source may be the second, third and higher order harmonics. Preferably, the second and third harmonics are used in the manner described above in connection with FIGURES 4D, 4E, 4F, and 4G. The second and third harmonic waves of appropriate magnitude and phase generated by the block 80 are applied to the adder 76. These waves may be obtained in various ways, for example, the output from the green wobbulating frequency source 61 could be applied to a class C amplifier having an output circuit tuned to the second or third or higher harmonic frequency as desired. The output taken from the output tuned circuit of the amplifier after being passed through a phase adjusted network would then be applied to the adder 76.

Referring now to FIGURE 7 there is shown a block diagram of a portion of the electrical part of the system of FIGURE 1 showing another way in which the second wobbulating wave, in particular the second harmonic thereof, may be applied to the electron beam device of FIGURE 1 to produce the desired spreading of electron charge under dark field conditions. In FIGURE 7 the same reference numerals are used to indicate identical elements of FIGURE 1 and the essential additions to FIGURE 1 are indicated in dotted blocks and dotted interconnections in FIGURE 4. Specifically, these additions include a second harmonic generator 81 driven from the green wobbulating frequency source 61, a phase control circuit 82 for appropriately adjusting the phase of the output of the second harmonic generator prior to the application of the output of the second harmonic generator 81 to the bias voltage 66 to appropriately alter the current in the electron beam at various portions of the vertical high frequency excursions thereof. More specifically, the second harmonic voltage applied to the bias voltage source 66 is adjusted in phase as represented in the waveform of FIGURE 4H so that at the peaks of vertical excursion the current in the electron beam is reduced to a minimum thereby producing the result of a more uniform distribution of electron charge over the light modulating medium under dark field conditions.

Referring now to FIGURE 8 there is shown a modification of the electrical part of FIGURE 1 for producing a waveform such as shown in FIGURE 4J and for application of such waveform in the manner described in connection with FIGURE 6 to produce desired uniform charge distribution under dark field conditions. In FIGURE 8 the same reference numerals are used to indicate the identical elements of FIGURE 1 and the essential additions to FIGURE 1 are indicated in dotted blocks and dotted interconnections. These additions consist essentially of a pulse generator 83 for developing a train of pulses of a fundamental frequency of the desired wobbulation rate. Such a train of pulses is modulated by the green video signal source 60 and then applied to a tuned circuit 84, for example, a parallel resonant circuit having a resonant frequency substantially lower than the repetition rate of the pulse train. Such a circuit has an inverse amplitude versus frequency response for frequencies above the resonant frequency as shown in graph 85. Accordingly, the output take from such a circuit has a fundamental rate determined by the repetition rate of the pulse train of pulse generator 83 and has a waveform approximating a sawtooth wave each cycle of which has an essentially uniformly falling portion and an essentially abrupt rising portion of duration substantially shorter during than the rising portion, such as shown in FIGURE 4J. When such a waveform is applied to the vertical deflection plates of the electron beam device the resultant charge distribution enables good dark field conditions to be obtained. If desired, the output of the tuned circuit 84 instead of the input could have been modulated by the green signal source 60. Any number of circuits may be used which have the inverse amplitude versus frequency response such as shown in graph 85 of amplitude versus frequency. One such circuit is described in patent application Serial No. 234,418, filed October 31, 1962, and assigned to the assignee of the present invention.

While the invention has been described in specific embodiments, it will be appreciated that many modifications may be made by those skilled in the art, and I intend by the appended claims to cover all such modifications and changes as fall within the true spirit and scope of the invention.

What I claim as new and desire to secure by Letters Patent of the United States is:

1. A system for controlling the intensity of each point of a beam of light in response to a respective point in an electrical signal for projecting an image corresponding to said electrical signal comprising:
   (a) a transparent light diffracting medium deformable by electric charges deposited thereon,
   (b) means for directing said beam of light on said medium,
   (c) means for directing a beam of electrons upon said medium to produce said charges in said medium,
   (d) means to deflect said electron beam over said medium in one direction at an intermediate frequency rate and in another direction perpendicular to said one direction at a low frquency rate to form a pattern of successive, spaced lines of charge thereon,
   (e) means for developing a fixed high frequency wave of predetermined amplitude,
   (f) means for developing another fixed high frequency wave having a frequency at least twice the frequency of said one wave, said other wave being smaller in amplitude than said one wave,
   (g) means for modulating the position of said beam of electrons in said other direction about a line of charge in response to said waves whereby said electron beam is caused to spread said lines of electron charge uniformly over said medium,
   (h) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal,
   (i) a mask having a set of transparent and opaque portions spaced from and disposed parallel to said one direction,
   (j) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

2. A system for controlling the intensity of each point of a beam of light in response to a respective point in an electrical signal for projecting an image corresponding to said electrical signal comprising:
   (a) a transparent light diffracting medium deformable by electric charges deposited thereon,
   (b) means for directing said beam of light on said medium,
   (c) means for directing a beam of electrons upon said medium to produce said charges in said medium,
   (d) means to deflect said electron beam over said medium in one direction at an intermediate frequency rate and in another direction perpendicular to said one direction at a lower frequency rate to form a pattern of successive, spaced lines of charge thereon,
   (e) means for developing a fixed high frequency wave,
   (f) means for developing another high frequency wave harmonically related to said one wave, means for combining said one wave with said other wave to produce a resulting wave, the phase and amplitude of said other wave with respect to the phase and amplitude of said one wave being arranged so that each cycle of said resultant wave has an essentially linear rising and falling portion,
   (g) means for modulating the position of said beam of electrons in said other direction about a line of charge in response to said resultant wave whereby said electron beam is caused to spread said lines of electron charge uniformly over said medium,
   (h) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (i) a mask having a set of transparent and opaque portions spaced from and disposed parallel to said one direction, (j) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

3. A system for controlling the intensity of each point of a beam of light in response to a respective point in an electrical signal for projecting an image corresponding to said electrical signal comprising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of succesive, spaced lines of charge thereon, (e) means for developing a fixed high frequency wave, (f) means for developing another high frequency wave having twice the frequency of said one wave, means for combining one wave with said other wave to produce a resultant wave, the phase of said other wave with respect to said one wave and the amplitude of said other wave with respect to said one wave being arranged so that each cycle of said resultant wave has an essentially linear gradually rising portion and an abruptly falling portion, (g) means for modulating the position of said beam of electrons in said other direction about a line of charge in response to said resultant wave whereby said electron beam is caused to spread said lines of electron charge uniformly over said medium, (h) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (i) a mask having a set of transparent and opaque portions spaced from and disposed parallel to said one direction, (j) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

4. A system for controlling the intensity of each point of a beam of light in response to a respective point in an electrical signal for projecting an image corresponding to said electrical signal compromising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a fixed high frequency wave, (f) means for developing another high frequency wave having twice the frequency of said one wave, means for combinig one wave with said other wave to produce a resultant wave, the phase of said other wave with respect to said one wave and the amplitude of said other wave with respect to said one wave being arranged so that each cycle of said resultant wave has an essentially linear gradually falling portion and an abruptly rising portion, (g) means for modulating the position of said beam of electrons in said other direction about a line of charge in response to said resultant periodic wave whereby said electron beam is caused to spread said lines of electron charge uniformly over said medium, (h) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (i) a mask having a set of transparent and opaque portions spaced from and disposed parallel to said one direction, (j) means for imaging light from said beam through said medium into the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

5. A system for controlling the intensity of each point of a beam of light in response to a respective point in an electrical signal for projecting an image corresponding to said electrical signal comprising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a fixed high frequency wave of predetermined amplitude, (f) means for modulating said beam of electrons in said other direction over said meduim by said wave, (g) means for developing another high frequency wave having exactly twice the frequency of said one wave, (h) means for varying the electron current flow in said beam in response to said other wave, the phase of said other wave with respect to said one wave and the amplitude of said other wave with respect to said one wave being arranged such that said electron beam is caused to spread lines of electron charge uniformly over said medium, (i) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (j) a mask having a set of transparent and opaque portions spaced from and disposed parallel to said one direction, (k) means for imaging light from said beam through said medium onto the opaque portions of said mask in the absence of deformations in said modulating meduim, whereby when diffraction gratings are formed in said meduim in response to said electrical signals said transparent portions pass diffracted light from each point of said beam incident on a respective point of said medium in proportion to the depth of deformations at said respective point.

6. A system for controlling the intensity of each point of a beam of light in response to a respective point in an electrical signal for projecting an image comprising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a fixed high frequency wave, (f) means for developing another high frequency wave having three times the frequency of said one wave, means for combining one wave with said other wave to produce a resultant wave, the phase of said other wave with respect to said one wave and the amplitude of said other wave with respect to said one wave being arranged so that each cycle of said resultant wave has essentially linear rising and falling portions of comparable durations, (g) means for modulating the position of said beam of electrons in said other direction about a line of charge in response to said resultant wave whereby said electron beam is caused to spread said lines of electron charge uniformly over said medium, (h) means for modulating said one wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (i) a mask having a set of transparent and opaque portions spaced from and disposed parallel to said one direction, (j) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

7. A system for controlling the intensity of each point of a beam of light in response to a respective point in an electrical signal for projecting an image corresponding to said electrical signal comprising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a train of pulses of fixed periodicity, (f) a transducer having an inverse amplitude versus frequency response, (g) means for applying said train of pulses to said transducer and obtaining from said transducer a resultant wave each cycle of which is essentially of saw-toothed form and a periodicity the same as the periodicity of said train of pulses, (h) means for modulating the position of said beam of electrons in said other direction about a line of charge in response to said resultant wave whereby said electron beam is caused to spread said lines of electron charge uniformly over said medium, (i) means for modulating said train of pulses inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (j) a mask having a set of transparent and opaque portions spaced from the disposed parallel to said one direction, (k) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

8. A system for controlling the intensity of each point of a beam of light in response to a respective point in an electrical signal for projecting an image corresponding to said electrical signal comprising:

(a) a transparent light diffracting medium deformable by electric charges deposited thereon, (b) means for directing said beam of light on said medium, (c) means directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a train of pulses of fixed periodicity, (f) a transducer having an inverse amplitude versus frequency response, (g) means for applying said train of pulses to said transducer and obtaining from said transducer a resultant wave each cycle of which is essentially of saw-toothed form and a periodicity the same as the periodicity of said train of pulses, (h) means for modulating the position of said beam of electrons in said other direction about a line of charge in response to said resultant wave whereby said electron beam is caused to spread said lines of electron charge uniformly over said medium, (i) means for modulating said resultant wave inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (j) a mask having a set of transparent and opaque portions spaced from and disposed parallel to said one direction, (k) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

9. A system for controlling the intensity of each point of a beam of light in response to a respective point in an electrical signal for projecting an image corresponding to said electrical signal comprising:

(a) a transparent light diffracting medium deformable by electric charges deposited thereon, (b) means for directing said beam of light on said medium, (c) means for directing a beam of electrons upon said medium to produce said charges in said medium, (d) means to deflect said electron beam over said medium in one direction at an intermediate frequency rate and in another direction perpendicular to said one direction at a low frequency rate to form a pattern of successive, spaced lines of charge thereon, (e) means for developing a train of pulses of fixed periodicity, (f) a circuit having a parallel resonant frequency substantially lower than said periodicity, (g) means for applying said train of pulses to said parallel resonant circuit and obtaining from said parallel resonant circuit a resultant wave each cycle of which is essentially of saw-toothed form and a periodicity the same as the periodicity of said train of pulses, (h) means for the position of said beam of electrons in said other direction about a line of charge in response to said resultant wave by said waves whereby said electron beam is caused to spread said lines of electron charge uniformly over said medium, (i) means for modulating said train of pulses inversely in amplitude by an electrical signal corresponding to the point by point intensity of an image to be projected whereby said lines of charge are caused to appear and to form a diffraction grating thereon having lines of deformation directed in said one direction in which the depth of deformation of a point of said grating corresponds to a respective point of said electrical signal, (j) a mask having a set of transparent and opaque portions spaced from and disposed parallel to said one direction, (k) means for imaging light from said beam through said medium onto the opaque portions of said mask in the absence of deformations in said modulating medium, whereby when diffraction gratings are formed in said medium in response to said electrical signals said transparent portions pass diffracted light from each point of said beam incident on a respective point of said medium in proportion to the depth of deformations at said respective point.

References Cited by the Examiner

UNITED STATES PATENTS 3,209,072   9/1965   Glenn _____ 178—5.4

DAVID G. REDINBAUGH, *Primary Examiner.*

J. O'BRIEN, *Examiner.*